United States Patent
Sayeed et al.

(10) Patent No.: US 9,474,064 B2
(45) Date of Patent: Oct. 18, 2016

(54) SYSTEM AND METHOD FOR CONTROLLING AN OPERATION OF AN APPLICATION BY FORECASTING A SMOOTHED TRANSPORT BLOCK SIZE

(71) Applicants: Zulfiquar Sayeed, Highstown, NJ (US); Qi Liao, Stuttgart (DE); Edward Grinshpun, Murray Hill, NJ (US); David Faucher, Murray Hill, NJ (US); Sameer Sharma, Murray Hill, NJ (US)

(72) Inventors: Zulfiquar Sayeed, Highstown, NJ (US); Qi Liao, Stuttgart (DE); Edward Grinshpun, Murray Hill, NJ (US); David Faucher, Murray Hill, NJ (US); Sameer Sharma, Murray Hill, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 86 days.

(21) Appl. No.: 14/607,990

(22) Filed: Jan. 28, 2015

(65) Prior Publication Data

US 2016/0219563 A1   Jul. 28, 2016

(51) Int. Cl.
| | |
|---|---|
| *H04L 12/26* | (2006.01) |
| *H04W 4/00* | (2009.01) |
| *H04B 17/00* | (2015.01) |
| *H04W 72/00* | (2009.01) |
| *G06F 15/173* | (2006.01) |
| *H04W 72/04* | (2009.01) |
| *H04L 1/00* | (2006.01) |
| *H04W 84/04* | (2009.01) |

(52) U.S. Cl.
CPC .......... *H04W 72/044* (2013.01); *H04L 1/0003* (2013.01); *H04W 84/042* (2013.01)

(58) Field of Classification Search
CPC . H04L 1/0001; H04L 1/0003; H04L 1/0019; H04L 1/0025; H04L 1/0026; H04L 1/20; H04L 5/00; H04L 67/34; H04W 28/16; H04W 52/22; H04W 52/143; H04W 52/223; H04W 52/226; H04W 52/228; H04W 52/241; H04W 52/262; H04W 72/04; H04W 72/044; H04W 84/042; H04B 17/20; H04B 17/24; H04B 17/26; H04B 17/373; H04B 17/382; G06F 9/5072
USPC ........ 370/310–350; 455/67.11, 69, 418–420, 455/452.2, 522; 709/208–209, 223–226
See application file for complete search history.

(56) References Cited

U.S. PATENT DOCUMENTS

| | | | | |
|---|---|---|---|---|
| 8,280,428 | B2 * | 10/2012 | Pietraski | ............... H04L 1/0001 455/452.2 |
| 8,645,529 | B2 * | 2/2014 | Doddavula | ................... 709/223 |

(Continued)

OTHER PUBLICATIONS

Febrero-Bande, et al., "Statistical Computing in Functional Data Analysis: The R Package fda.usc," *Journal of Statistical Software*, vol. 51, No. 4, Oct. 2012.
"3$^{rd}$ Generation Partnership Project; Technical Specification Group Services and System Aspects; Policy and Charging Control Architecture (Release 13)," *3GPP TS 23.203*, Dec. 2014.
"3rd Generation Partnership Project; Technical Specification Group Radio Access Network; Evolved Universal Terrestrial Radio Access (E-UTRA); Physical Layer Procesures (Release 9)," *3GPP TS 36.213*, Tables 7.1.7.1-1 and 7.1.7.2.1-1, Dec. 2009.

(Continued)

*Primary Examiner* — Tri H Phan
(74) *Attorney, Agent, or Firm* — Harness, Dickey & Pierce, P.L.C.

(57) ABSTRACT

A smoothed transport block size is forecasted by predicting future value information based on historical time series data obtained at an e-Node B. The historical time series data includes historical transport block size information and historical modulation and coding scheme information. A mapping function is used to correlate the future value information with historical transport block size information. Once the mapping function is determined, the mapping function forecasts the average transport block sizes by inputting the future value information into the mapping function. The smoothed transport block sizes and the future value information is then transmitted to an application server and/or an application client at a user equipment to control an operation of an application.

20 Claims, 8 Drawing Sheets

(56) References Cited

U.S. PATENT DOCUMENTS

| | | | |
|---|---|---|---|
| 2012/0089726 A1* | 4/2012 | Doddavula | H04L 67/34 709/224 |
| 2013/0170469 A1* | 7/2013 | Yu | H04L 1/0003 370/330 |
| 2015/0112766 A1* | 4/2015 | Barney | G06Q 30/0203 705/7.32 |
| 2015/0373568 A1* | 12/2015 | Abrishamkar | H04W 72/0406 370/252 |

OTHER PUBLICATIONS

George E.P. Box, et al., "Time Series Analysis," Prentice Hall, 3rd Edition, 1994, pp. 7-18.

R.J. Hyndman, et al., "Automatic Time Series Forecasting: The Forecast Package for R," *Journal of Statistics Software*, vol. 27, No. 3, Jul. 2008.

Famaey, et al., "On the Merits of SVC-Based HTTP Adaptive Streaming," *IFIP/IEEE International Symposium on Integrated Network Management*, 2013.

\* cited by examiner

FIG. 1 (CONVENTIONAL)

FIG. 2 (CONVENTIONAL)

FIG. 4 eNodeB with Transport Block Size Forecaster (TBSF)

FIG. 5

FIG. 6. LTE network with TBSF in eNodeB

FIG. 7. LTE network with distributed TBSF

SYSTEM AND METHOD FOR CONTROLLING AN OPERATION OF AN APPLICATION BY FORECASTING A SMOOTHED TRANSPORT BLOCK SIZE

BACKGROUND OF THE INVENTION

1. Field of the Invention

Example embodiments relate generally to a system and method for controlling an operation of an application by forecasting a smoothed transport block size.

2. Related Art

Figure 1:
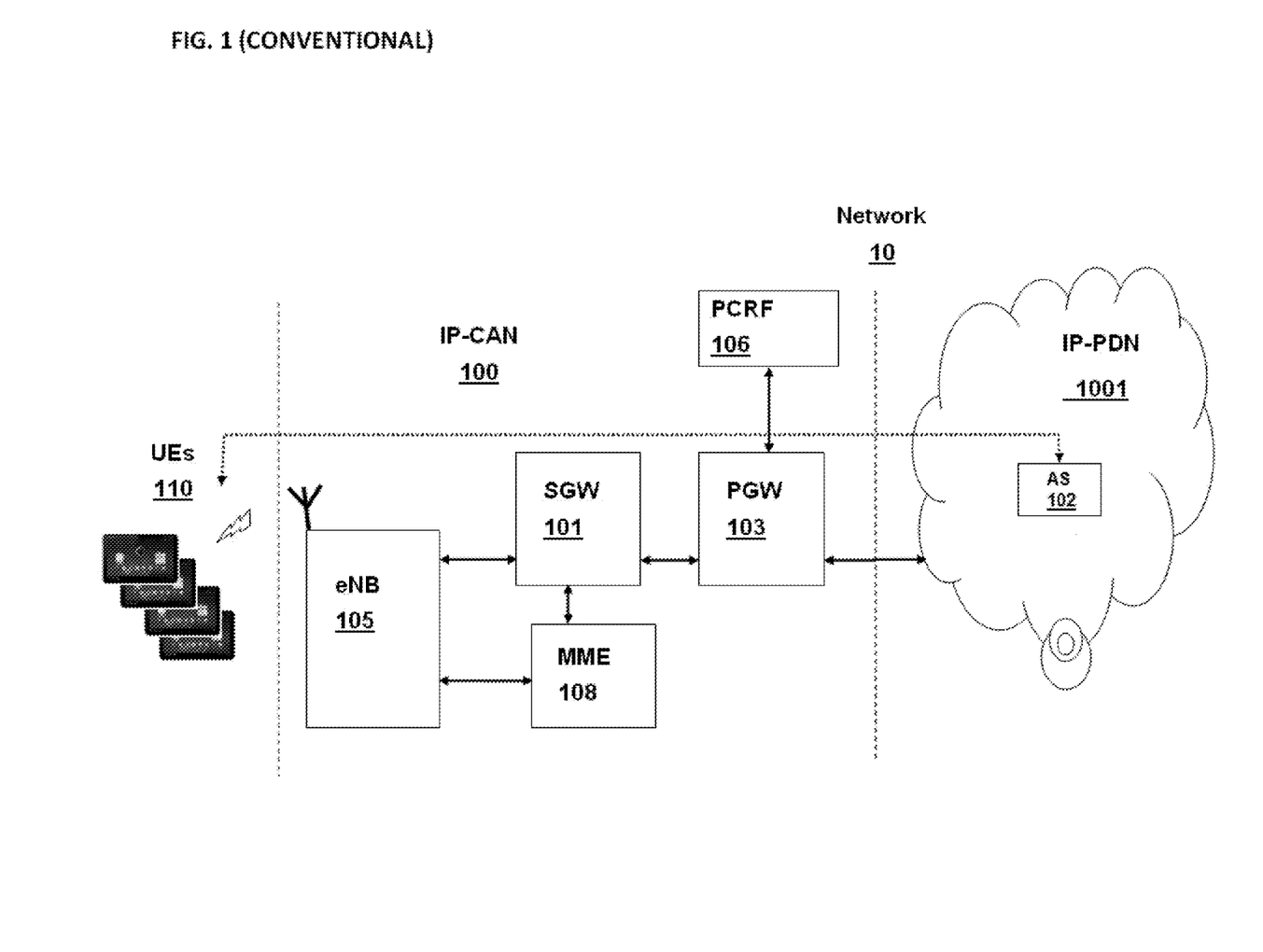
FIG. 1 illustrates a conventional $3^{rd}$ Generation Partnership Project Long-Term Evolution (3GPP LTE) network.

FIG. 1 illustrates a conventional $3^{rd}$ Generation Partnership Project Long-Term Evolution (3GPP LTE) network 10. The network 10 includes an Internet Protocol (IP) Connectivity Access Network (IP-CAN) 100 and an IP Packet Data Network (IP-PDN) 1001. The IP-CAN 100 generally includes: a serving gateway (SGW) 101; a packet data network (PDN) gateway (PGW) 103; a policy and charging rules function (PCRF) 106; a mobility management entity (MME) 108 and E-UTRAN Node B (eNB) 105 (i.e., base station, for the purposes herein the terms base station and eNB are used interchangeably). Although not shown, the IP-PDN 1001 portion of the EPS may include application or proxy servers, media servers, email servers, etc.

Within the IP-CAN 100, the eNB 105 is part of what is referred to as an Evolved Universal Mobile Telecommunications System (UMTS) Terrestrial Radio Access Network (EUTRAN), and the portion of the IP-CAN 100 including the SGW 101, the PGW 103, the PCRF 106, and the MME 108 is referred to as an Evolved Packet Core (EPC). Although only a single eNB 105 is shown in FIG. 1, it should be understood that the EUTRAN may include any number of eNBs. Similarly, although only a single SGW, PGW and MME are shown in FIG. 1, it should be understood that the EPC may include any number of these core network elements.

The eNB 105 provides wireless resources and radio coverage for one or more user equipments (UEs) 110. That is to say, any number of UEs 110 may be connected (or attached) to the eNB 105. The eNB 105 is operatively coupled to the SGW 101 and the MME 108.

The SGW 101 routes and forwards user data packets, while also acting as the mobility anchor for the user plane during inter-eNB handovers of UEs. The SGW 101 also acts as the anchor for mobility between $3^{rd}$ Generation Partnership Project Long-Term Evolution (3GPP LTE) and other 3GPP technologies. For idle UEs 110, the SGW 101 terminates the downlink data path and triggers paging when downlink data arrives for UEs 110.

The PGW 103 provides connectivity between UE 110 and the external packet data networks (e.g., the IP-PDN) by being the point of entry/exit of traffic for the UE 110. As is known, a given UE 110 may have simultaneous connectivity with more than one PGW 103 for accessing multiple PDNs.

The PGW 103 also performs policy enforcement, packet filtering for UEs 110, charging support, lawful interception and packet screening, each of which are well-known functions. The PGW 103 also acts as the anchor for mobility between 3GPP and non-3GPP technologies, such as Worldwide Interoperability for Microwave Access (WiMAX) and $3^{rd}$ Generation Partnership Project 2 (3GPP2 (code division multiple access (CDMA) 1× and Enhanced Voice Data Optimized (EvDO)).

Still referring to FIG. 1, eNB 105 is also operatively coupled to the MME 108. The MME 108 is the control-node for the EUTRAN, and is responsible for idle mode UE 110 paging and tagging procedures including retransmissions. The MME 108 is also responsible for choosing a particular SGW for a UE during initial attachment of the UE to the network, and during intra-LTE handover involving Core Network (CN) node relocation. The MME 108 authenticates UEs 110 by interacting with a Home Subscriber Server (HSS), which is not shown in FIG. 1.

Non Access Stratum (NAS) signaling terminates at the MME 108, and is responsible for generation and allocation of temporary identities for UEs 110. The MME 108 also checks the authorization of a UE 110 to camp on a service provider's Public Land Mobile Network (PLMN), and enforces UE 110 roaming restrictions. The MME 108 is the termination point in the network for ciphering/integrity protection for NAS signaling, and handles security key management.

The MME 108 also provides control plane functionality for mobility between LTE and 2G/3G access networks with an interface from the SGSN (not shown) terminating at the MME 108.

The Policy and Charging Rules Function (PCRF) 106 is the entity that makes policy decisions and sets charging rules. It has access to subscriber databases and plays a role in the 3GPP architecture as specified in 3GPP TS 23.303 "Policy and Charging Control Architecture."

Applicant server (AS) 102 is a server/node residing in IP-PDN 1001 that interfaces with UEs 110 in order to run applications on the UEs 110. AS 102 may for instance be a social networking website host, a service provider for online movies, etc.

Figure 2:
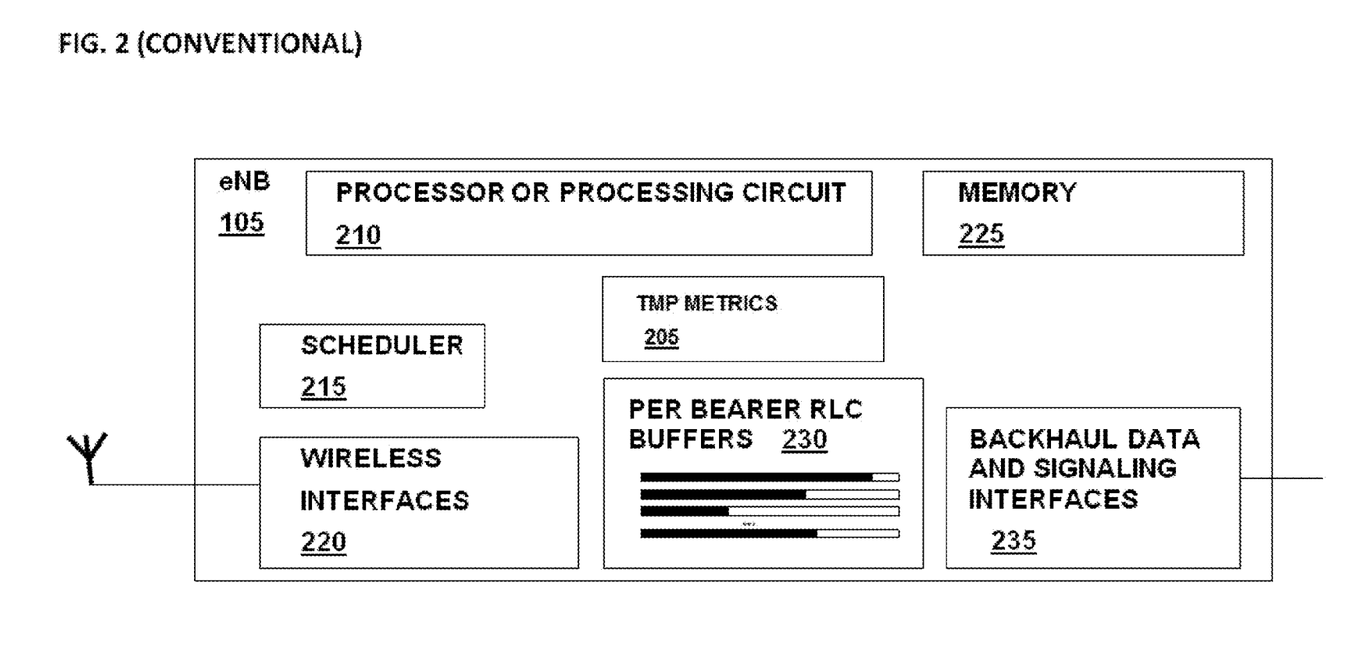
FIG. 2 illustrates a conventional E-UTRAN Node B (eNB)

FIG. 2 illustrates a conventional E-UTRAN Node B (eNB) 105. The eNB 105 includes: a memory 225; a processor 210; a scheduler 215; wireless communication interfaces 220; functions for MCS calculations 230 for each bearer; a transport-block size/modulation-and-coding-scheme/physical-resource-block (TMP) metrics 205 which accumulate the metrics from 215 and 210; and a backhaul interface 235. The processor 210 may also be referred to as a core network entity processing circuit, an EPC entity processing circuit, etc. The processor 210 controls the function of eNB 105 (as described herein), and is operatively coupled to the memory 225 and the communication interfaces 220.

The eNB 105 may include one or more cells or sectors serving UEs 110 within individual geometric coverage sector areas. Each cell individually may contain elements depicted in FIG. 2. Throughout this document the terms eNB, cell or sector shall be used interchangeably.

Still referring to FIG. 2, the communication interfaces 220 include various interfaces including one or more transmitters/receivers connected to one or more antennas to transmit/receive (wireline and/or wirelessly) control and data signals to/from UEs 110 or via a control plane or interface to other EPC network elements and/or RAN elements. Backhaul interface 235 is the portion of eNB 105 that interfaces with SGW 101 and MME 108 within IP-CAN 100. The scheduler 215 schedules control and data communications that are to be transmitted and received by the eNB 105 to and from UEs 110. The memory 225 may buffer and store data that is being transmitted and received to and from eNB 105.

Every Transmission Time Interval (TTI), typically equal to 1 millisecond, the scheduler 215 may allocate a certain number of Physical Resource Blocks (PRBs) to different bearers carrying data over the wireless link in the Downlink direction (i.e., transmitting from eNB 105 to UE 110) and Uplink direction (i.e., receiving data at eNB 105 from UE 110, which is received over backhaul 235). A "bearer" may be understood to be a link or channel used to exchange information to run application on the UE 110. The scheduler 215 may determine Modulation and Coding Schema (MCS) that may define how many bits of information per second per Hz may be packed into the allocated number of PRBs. The latter is defined by the 3GPP TS36.213 tables 7.1.7.1-1 and 7.1.7.2.1-1 (the contents of which is incorporated by reference in its entirety), where MCS is defined by a number between 0 and 28, where higher MCS values indicate that more bits may be allocated in a number of PRBs. The tables 7.1.7.1-1 and 7.1.7.2.1-1 include a lookup table for a number of bits of data that may be included in PRBs sent per TTI for a given allocated number of PRBs and a MCS value. MCS is computed by the scheduler using Channel Quality Indicator (CQI) values reported by the UE 110 that in turn may be derived from measured UE 110 wireless channel conditions in the form of Signal to Interference and Noise Ratio (SINR).

Scheduler 215 may make PRB allocation decisions based upon a Quality of Service (QoS) Class Identifier (QCI), which represents traffic priority hierarchy. There are nine QCI classes currently defined in LTE, with 1 representing highest priority and 9 representing the lowest priority. QCIs 1 to 4 are reserved for Guaranteed Bitrate (GBR) classes for which the scheduler maintains certain specific data flow QoS characteristics. QCIs 5 to 9 are reserved for various categories of Best Effort traffic.

Conventionally, the TMP metrics 205 may calculate appropriate transport block sizes (TBS) for data packets that are to be transmitted over wireless interface 220 towards UE in the downlink direction, by determining a number of physical resource blocks (PRBs) and an optimal modulation and coding scheme (MCS), as defined in a lookup table provided in standard 3GPP TS 36.213. However, due to the concavity of the 3GPP TS 36.213 lookup table, predictions in TBS values (when derived only from the look up table with predicted MCS and predicted PRBs input to the look up table) may be error prone. Furthermore, difficulty in accurately predicting TBS is caused by at least two additional reasons. First, knowing the MCS depends on channel quality information and a signal to noise ratio (SINR) for a bearer, while the number of PRBs depends on resource allocation strategies and various network state variables (e.g., the physical channel state, a traffic/data load and inter-cell interference level). The required TBS is therefore affected by all of the above-mentioned variables, in addition to fine-scale structures and rapid phenomena limitations. This means that a required TBS may vary significantly from time slot to time slot. Second, any noisy and/or inaccurate measurements or reports may increase the difficulty in arriving at a regression model for prediction.

Conventionally, the metrics of interest in determining TBS are determined using the following basic steps:

1. The UE receives a downlink transmission from an eNB.
2. The UE calculates an SINR for the received signal by way of embedded pilot tones in the received signal.
3. The UE calculates a Channel Quality Indicator (CQI) based on capacity calculations (for additive white Gaussian noise, or AWGN, channels, as an example) and reports the CQI to eNB.
4. The eNB receives the CQI and determines the SINR for the UE.
5. The eNB obtains a number of Physical Resource Blocks (PRBs) to be allocated to the UE in a next Transmission Time Index (TTI) by using the cell load in conjunction with an eNB scheduler algorithm.
6. The SINR calculated in (4) is used to select an appropriate Modulation Coding Scheme (MCS) for the UE for the next TTI. Thus MCS is strictly a channel quality driven metric.
7. The MCS and PRB calculated in (5) and (6) above are used to calculate an appropriate Transport Block Size (TBS) for transmission in the next TTI, by way of the lookup table of 3GPP TS 36.213.

Conventionally, there has been a significant amount of research involved in determining channel quality and/or link quality predictions. However, predicting appropriate future TBS values based on MCS and PRBs information has not been well-defined. Predicting accurate values for future TBS values may be used to better control an application level behavior especially with regard to video applications, and this type of prediction may also be used for other applications.

SUMMARY OF INVENTION

At least one example embodiment relates to a method of exporting a smoothed transport block size to control an operation of an application.

In one example embodiment, the method includes obtaining, by one or more processors of at least one network node, historical time series data, the historical time series data including historical transport block size information, historical modulation and coding scheme information and historical physical resource block utilization information; predicting, by the one or more processors, future value information based on the historical time series data, the future value information including modulation and coding scheme future values and physical resource block future values; producing, by the one or more processors, a mapping function regressing first input data to first output data, the first input data including the historical modulation and coding scheme information and the historical physical resource block utilization information, the first output data including the historical transport block size information; forecasting, by the one or more processors, a smoothed transport block size by inputting the future value information into the mapping function; and exporting, by the one or more processors, the smoothed transport block size to a network node to control an operation of an application.

In one example embodiment, the method includes wherein the exporting of the smoothed transport block size includes exporting the smoothed transport block size to at least one of an application server and an application client server at a user equipment in order to control the operation of the application.

In one example embodiment, the method further includes smoothing the historical time series data prior to predicting the future value information, wherein the future value information is smoothed future value information.

In one example embodiment, the method includes wherein the predicting of the future value information based on the historical time series data includes using Auto-Regressive Integrated Moving Average (AMNIA) regression modeling to predict the future value information.

In one example embodiment, the method includes wherein the predicting of the future value information based on the historical time series data includes the future value information being quantized to a first and second set of discrete numbers, the first set of discrete numbers being the modulation and coding scheme future values, and the second set of discrete numbers being the physical resource block future values.

In one example embodiment, the method includes wherein the forecasting of the smoothed transport block size further includes forecasting a third set of discrete numbers by inputting the first set of discrete numbers and the second set of discrete numbers into the mapping function, the mapping function being a functional regression model, the third set of discrete numbers being transport block size future values.

In one example embodiment, the method includes wherein the first set of discrete numbers, the second set of discrete numbers, and the third set of discrete numbers each are assigned an observation period, wherein the observation period is one of preselected, adjustable and adaptable.

In one example embodiment, the method includes wherein the forecasting of the smoothed transport block size further includes smoothing the transport block size future values, the smoothing being accomplished via a kernel utilizing a smoothing bandwidth and distance measure, the smoothing bandwidth and the distance measure being one of preselected, adjustable and adaptable.

In one example embodiment, the method includes wherein the future value information and the forecasted average transport block size are determined for a selectable time-increment that is ahead of real-time.

In one example embodiment, the method includes wherein the obtaining step is performed at an e-Node B, and the predicting, the producing and the forecasting step is performed at a managing entity outside of the e-Node B.

In one example embodiment, the method further includes, exporting at least one of the modulation and coding scheme future values and the physical resource block future values to at least one of the application server and the application client at the user equipment in order to control the operation of the application.

At least one example embodiment relates to a network node.

In one example embodiment, the network node includes one or more processors configured to, obtain historical time series data, the historical time series data including historical transport block size information, historical modulation and coding scheme information and historical physical resource block utilization information, predict future value information based on the historical time series data, the future value information including modulation and coding scheme future values and physical resource block future values, produce a mapping function regressing first input data to first output data, the first input data including the historical modulation and coding scheme information and the historical physical resource block utilization information, the first output data including the historical transport block size information, forecast a smoothed transport block size by inputting the future value information into the mapping function, and export the smoothed transport block size to a network node to control an operation of an application.

In one example embodiment, the network node includes wherein the one or more processors is further configured to export the smoothed transport block size by exporting the smoothed transport block size to at least one of an application server and an application client server at a user equipment in order to control the operation of the application.

In one example embodiment, the network node includes wherein the one or more processors is further configured to smooth the historical time series data prior to predicting the future value information, wherein the future value information is smoothed future value information.

In one example embodiment, the network node includes wherein the one or more processors is further configured to predict the future value information based on the historical time series data includes using Auto-Regressive Integrated Moving Average (ARIMA) regression modeling to predict the future value information.

In one example embodiment, the network node includes wherein the one or more processors is further configured to predict the future value information based on the historical time series data by the future value information being quantized to a first and second set of discrete numbers, the first set of discrete numbers being the modulation and coding scheme future values, and the second set of discrete numbers being the physical resource block future values.

In one example embodiment, the network node includes wherein the one or more processors is further configured to forecast the smoothed transport block size by forecasting a third set of discrete numbers by inputting the first set of discrete numbers and the second set of discrete numbers into the mapping function, the mapping function being a functional regression model, the third set of discrete numbers being transport block size future values.

In one example embodiment, the network node includes wherein the one or more processors is further configured to assigned an observation period for each of the first set of discrete numbers, the second set of discrete numbers, and the third set of discrete numbers, wherein the observation period is one of preselected, adjustable and adaptable.

In one example embodiment, the network node includes wherein the one or more processors is further configured to forecast the smoothed transport block size by smoothing the transport block size future values, the smoothing being accomplished via a kernel utilizing a smoothing bandwidth and distance measure, the smoothing bandwidth and the distance measure being one of preselected, adjustable and adaptable.

In one example embodiment, the network node includes wherein the one or more processors is further configured to, export at least one of the modulation and coding scheme future values and the physical resource block future values to at least one of the application server and the application client at the user equipment in order to control the operation of the application.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

General Methodology:

Instant example embodiments are generally drawn toward accurately predicting averaged (smoothed) future transport block size (TBS) values. TBS defines how many bytes may be transferred in transport blocks, and from that standpoint needed TBSs may not be fixed, as this need may change over a period of time. Therefore, an averaged TBS value may be helpful in proactively improving/optimizing network links to support packet scheduling and routing. This improvement/optimization can be particularly helpful in supporting applications such as video that may experience noticeable degradation when TBS values may be incorrectly implemented.

In general, the SINR experienced by an UE may be available in order to predict expected future values of SINR. For instance, CQI may be derived from SINR, and at an eNB the CQI may be used to calculate MCS. As such, past MCS and SINR values may be saved to memory within an eNB. The PRB may be dictated by a cell load based particularly on user behavior and data demand, and past PRB usage may also be saved to memory within an eNB. By using past MCS and PRB usage data for a particular bearer, functional regression techniques may be used to calculate future values for TBS by generally predicting averaged (smoothed) future values for MCS/PRB, determining a functional relationship of TBS in terms of the MCS/PRB information, and then predicting averaged future values of TBS using this information. It should be noted that the smoothed predicted value may be obtained because the metrics may be smoothed before regression (using a functional or Auto-Regressive Integrated Moving Average (ARIMA) type of regression) may be performed to learn the models and then the models may be used to predict future values.

Figure 3A:
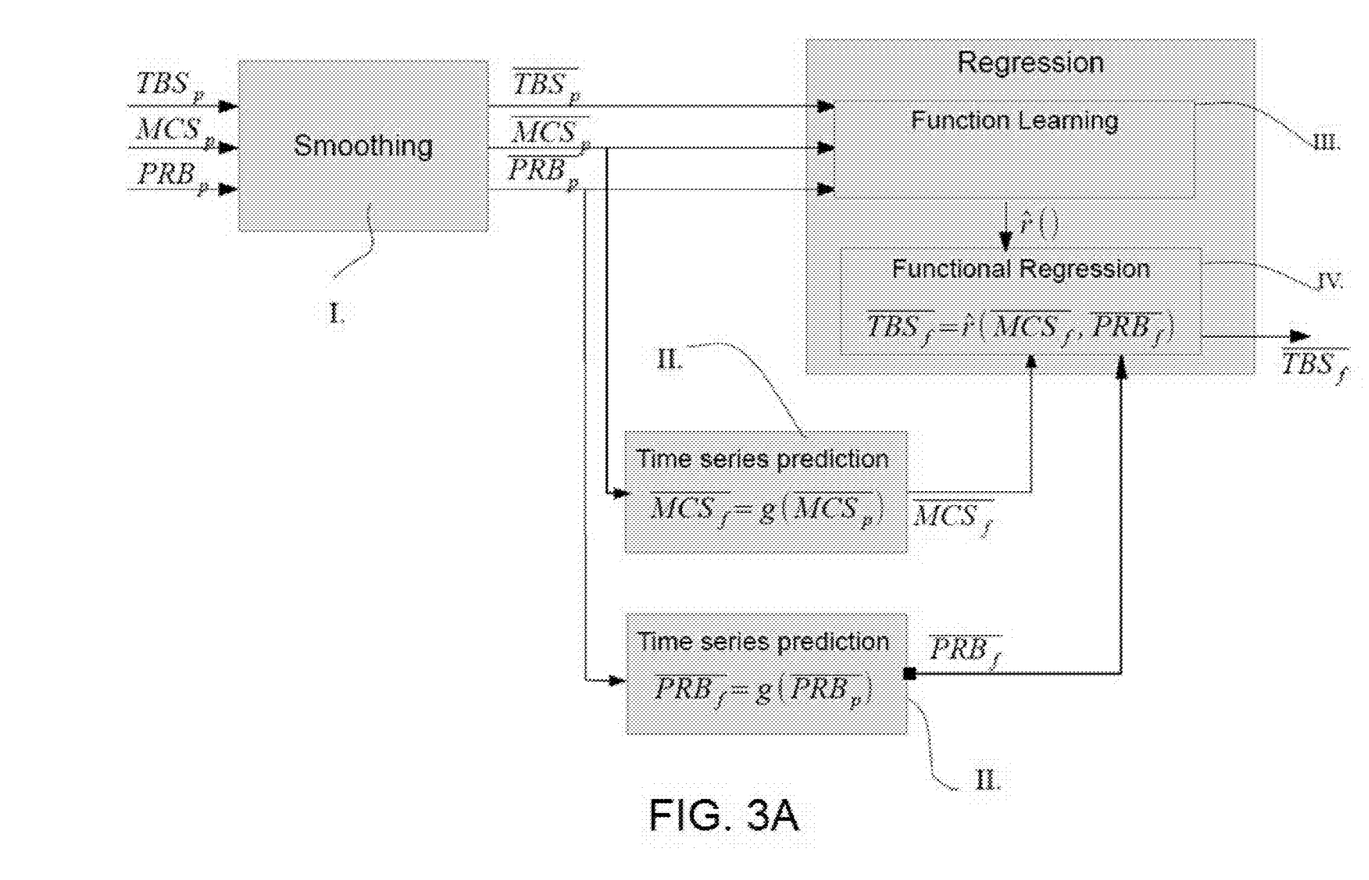
FIG. 3A is a flowchart depicting the general methodology for forecasting transport block sizes (TBSs), in accordance with an example embodiment.

A method that may be involved in predicting future TBS values is shown in FIG. 3A, in accordance with an example embodiment. This example embodiment involves a two-tier structure, including: predicting an MCS and a number of PRBs, and then predicting TBS values using the predicted MCS/PRB information. Referring to FIG. 3A, four basic steps are shown (labelled I.-IV.) and described below:

I. Smoothing time series data: This step tracks historical TBS, MSC and PRB values to compile discrete-valued time series data on these historical (past) values. These historical time series values may be "smoothed" (as described below in step S502 of FIG. 5) in order to produce smoothed historical (past) $\overline{TBS_p}$, $\overline{MCS_p}$ and $\overline{PRB_p}$ values. An example of smoothing is the operation of averaging. For example, M values of the per TTI metrics may be summed and divided by M, creating a smoothed metric time series which may be denoted by $\overline{TBS_p}$, $\overline{MCS_p}$ and $\overline{PRB_p}$. Prior to the smoother, metrics may be available once per TTI (1 milli-second). After the smoother, the metrics may be available at every M TTI (M being in milli-seconds). This M time duration may be referred to as 1 time-increment, or 1 smoothing time-interval, throughout the remainder of this document.

II. Predicting smoothed future MCS and PRB values: Using the smoothed $\overline{MCS_p}$ and $\overline{PRB_p}$ values, regression modeling may then be used to determine future MCS values, which may be denoted as $\overline{MCS_f}$ and $\overline{PRB_f}$. Well known Auto-Regressive Integrated Moving Average (ARIMA) modeling may be used to generate ARIMA models for the $\overline{MCS_p}$ and $\overline{PRB_p}$ processes. The ARIMA modeling and prediction are well-known in the arts, and described for example in "Time Series Analysis", George E. P. Box, Gwilym M. Jenkins, Gregory C. Reinsel, 3rd Edition, Prentice Hall, 1994, pages 7-18 and "Automatic Time Series Forecasting: The forecast Package for R", R. J. Hyndman and Y. Khandakar, Journal of Statistics Software, Vol 27, No. 3, July 2008 (the contents of each of which is incorporated by reference in its entirety). $\overline{MCS_p}$ and $\overline{PRB_p}$ may be independently modeled as ARIMA processes, where the model may be derived and the model may be used to calculate predicted values $\overline{MCS_f}$ and $\overline{PRB_f}$. The prediction may occur one-time-increment ahead of real time, but the prediction may be generalized to n time-increments ahead of real time, where n>1.

III. Producing a functional regression mapping function using past smoothed values of $\overline{TBS_p}$ and past smoothed $\overline{MCS_p}$ and $\overline{PRB_p}$ in a "training phase": The past smoothed values $\overline{MCS_p}$ and $\overline{PRB_p}$ may be used as "training input" to create functional regression model that creates the output $\overline{TBS_p}$. Specifically, this "training input" can be compared to the "smoothed" prediction TBS values ($\overline{TBS_p}$), which can be considered "training output," to define the functional regression model. The functional regression function may be further defined, as follows.

1. The input X may be defined as $X_i = \{\overline{MCS_p}(i), \overline{PRB_p}(i)\}$ where i may be the time index time increments of the smoothed metric (i=1, 2, 3, . . . N; N may be the training sequence length).
 2. The output may be modeled as $y_i = \overline{TBS_p}(i)$, where i may be the time index of the smoothed metric (i=1, 2, 3, . . . N; N may be the training sequence length).
 3. The relationship may be derived by using reference: Statistical Computing in Functional Data Analysis: The R Package fda.usc, Manuel Febrero-Bande, Manuel Oviedo de la Fuente, Journal of Statistical Software, Vol. 51, Issue 4, October 2012 (the contents of which is incorporated by reference in its entirety).

Using this modelling, the following function may be derived:

$$\hat{r}(X) = \frac{\sum_{i=1}^{N} K(h^{-1}d(X, X_i))y_i}{\sum_{i=1}^{N} K(h^{-1}d(X, X_i))} \qquad \text{Equation 1}$$

Where the y (output) and X (input) as defined above may be modeled to be related as:

$$y_i = r(X_i) + \epsilon_i \qquad \text{Equation 2}$$

Where $\epsilon_i$ may be the error term and K may be a suitable kernel (such as a Triweight kernel, or other Kernel that are well-known in the art).

$$K(u) = \frac{35}{32}(1-u^2)^2 1_{\{|u| \leq 1\}} \qquad \text{Equation 3}$$

Where, $1_{\{|u|\le 1\}}$ may be an indicator function the value of which is 1 if the braced condition is satisfied and 0 otherwise. h may be a smoothing parameter (i.e., smoothing bandwidth) and may be predefined or optimized by validation criterion (see above reference). The r̂(X) function may be estimated as the functional regression. d(X, X$_i$) may be a distance measure in the Euclidean sense between the points X and X$_i$.

$$d(X, X_i) = d(\{MCS, PRB\}, \{\overline{MCS_p(i)}, \overline{PRB_p(i)}\}) = \sqrt{(MCS - \overline{MCS_p(i)})^2 + (PRB - \overline{PRB_p(i)})^2}$$ Equation 4

IV. Predicting the smoothed TBS: Using the trained r̂(X) future values of $\overline{TBS_f(i)}$, (i=N+1, N+2, N+3, . . . , where N is a number of time increments in an observation interval) may be predicted as follows:

$$\overline{TBS_f(i)} = \hat{r}(\overline{MCS_f(i)}, \overline{PRB_f(i)})$$ Equation 5

Figure 3B:
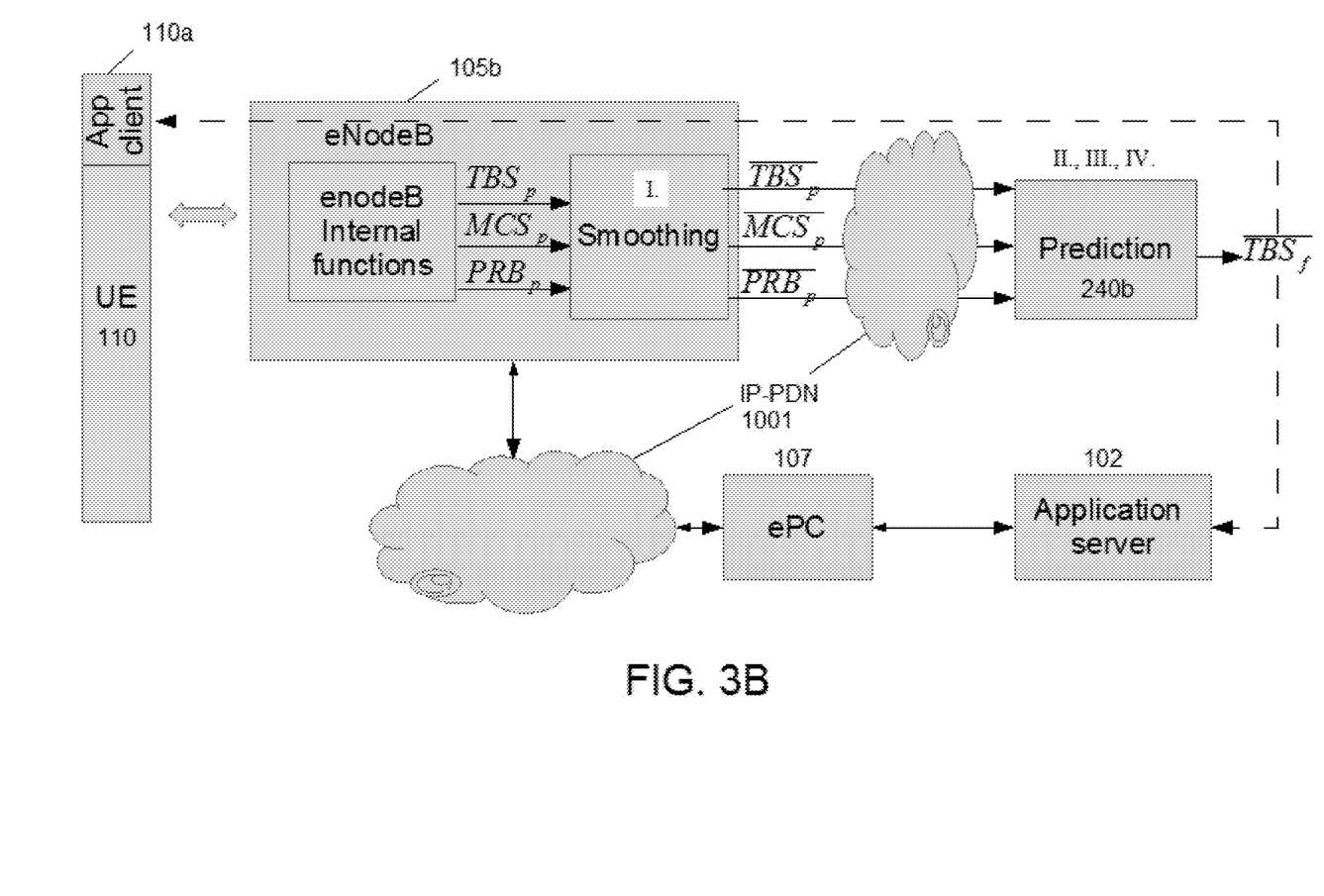
FIG. 3B is another flowchart depicting a general methodology for forecasting transport block sizes (TBSs) and transporting the prediction to application servers and clients, in accordance with an example embodiment.

Based on the four general TBS prediction steps described above, it should be understood that these steps may all be accomplished in a Transport Block Size Forecaster (TBSF) 240 of a reconfigured eNB 105a (see FIG. 4, described below in more detail). Or, optionally the four steps may distributed within an IP-CAN network, as shown in FIG. 3B. Specifically, as shown in FIG. 3B, step (I) may be accomplished at a reconfigured eNB 105b, and the smoothed and predicted values as $\overline{TBS_p}$, $\overline{MCS_p}$, and $\overline{PRB_p}$ may be sent over IP-PDN 1001 to a separate node 240b. For instance, node 240b may be a stand-alone, dedicated server in a reconfigured IP-CAN network 100b (see FIG. 7, described below) that may be controlled by a processor that may be separate from processor 210 of eNB 105a. In node 240b, prediction steps (II)-(IV) may be accomplished, and the resulting future smoothed prediction $\overline{TBS_f}$ values may then be shared with application server 102 and an application client 110a in UE 110 that may be running an application. The ePC (Enhanced Packet Core) includes blocks 101, 103, 106, 108 of FIG. 1.

Figure 4:
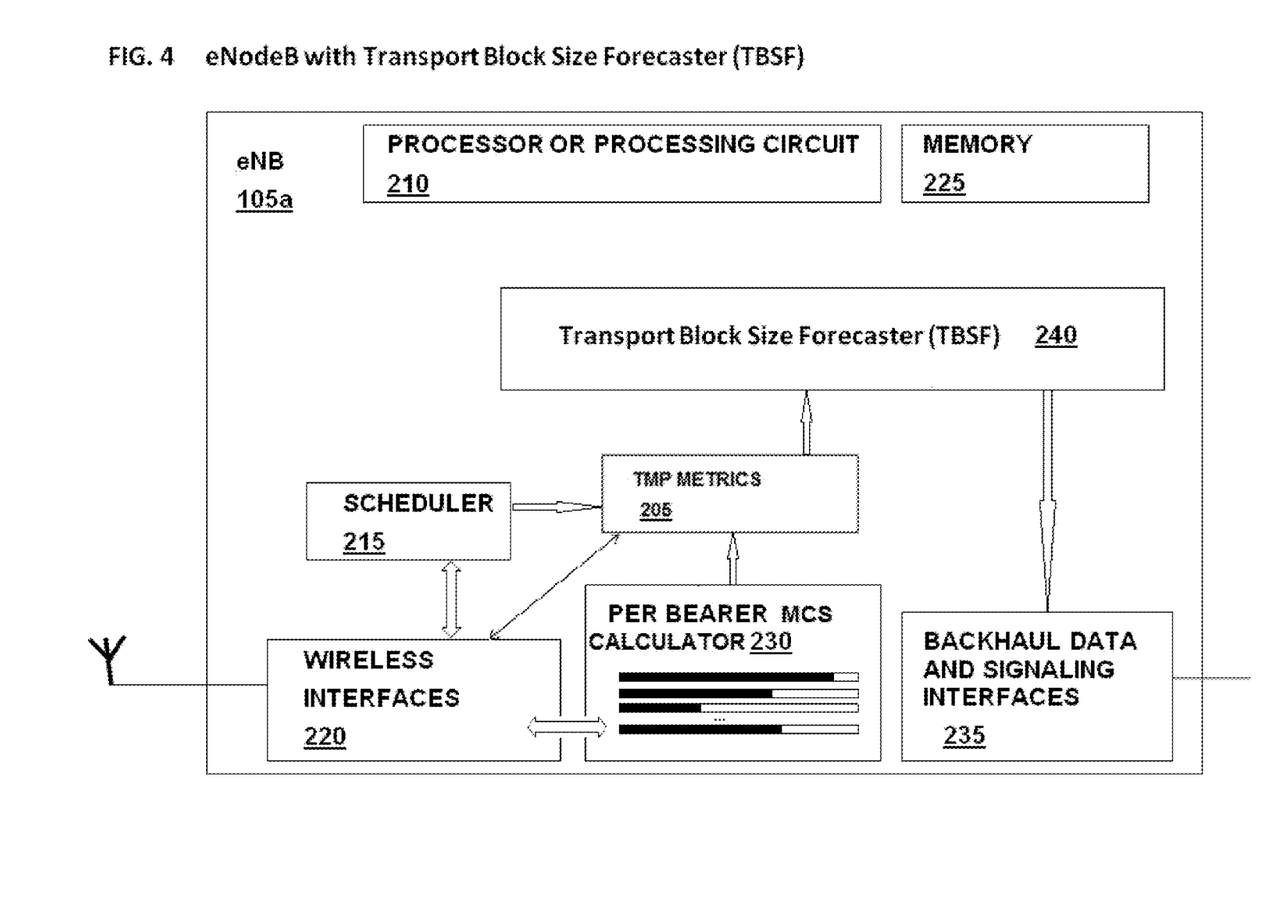
FIG. 4 illustrates a reconfigured e-Node B, in accordance with an example embodiment.

FIG. 4 illustrates a reconfigured e-Node B 105a, in accordance with an example embodiment. In this embodiment, the general prediction steps (I)-(IV), which are described with respect to FIG. 3A above, may be accomplished in the transport block size forecaster (TBSF) 240, within the reconfigured eNB 105a. Specifically, the function of TBSF 240 is described in greater detail, in relation to the detailed method steps of FIG. 5, below.

Figure 5:
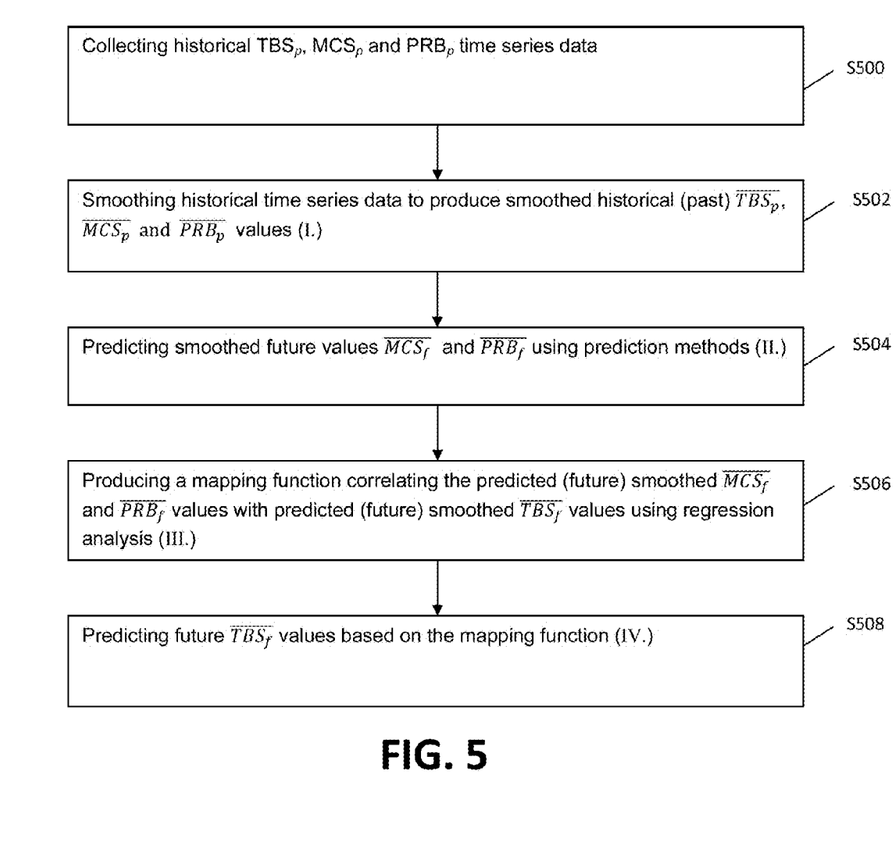
FIG. 5 is a method of forecasting transport block sizes (TBSs), in accordance with an example embodiment.

FIG. 5 is a method of forecasting transport block sizes (TBSs), in accordance with an example embodiment. These steps may be performed in TBSF 240 (shown in FIG. 4). In step S500, historical (past) TBS, MCS and PRB data may be collected at TBSF 240. TBSF 240 may obtain this information from TMP metrics 205. Specifically, TMP metrics 205 derives MCS values from scheduled transmissions occurring at scheduler 215, and TMP metrics 205 derives TBS and PRB values from interfacing communications with both scheduler 215 and MCS Calculator 230. The historical (past) times series information may be denoted as TBS$_p$, MCS$_p$ and PRB$_p$.

In step S502, TBSF 240 may "smooth" the historical time series values TBS$_p$, MCS$_p$ and PRB$_p$. The purpose of the "smoothing" is to condition the historical time series data to remove abrupt changes in these values to then use the data as "training data" for regression modeling (see step S506, below). For this purpose, smoothing methods may applied to the time series values to capture patterns in the historical data, which may be free of noise, fine-scale structures, and/or rapid phenomena. The "smoothed" values of the historical time series data may be denoted as $\overline{MCS_p}$, $\overline{PRB_p}$ and $\overline{TBS_p}$ respectively. One more effect of smoothing may be to reduce the required operations per second of the processor. Because after smoothing operations may be done at the rate of the averaging window. Thus if we smooth over a 100 m-sec window, the processing time may be 100 times larger than if the processing was done on a per TTI basis.

To perform the smoothing, a smoothing function may be applied over a last N time units, where N may be an adjustable value. Because MCS, PRB and TBS data may be generally available at the TMP metrics 205 at time increments of approximately 1 milliseconds, N time units may therefore be an adjustable value corresponding to a number of milliseconds, as an example. However, during the N time units, PRB may be zero if UE 110 does not have any scheduled transmissions during the N time units. In such a case, a simple smoothing function may be applied to sum all non-zero entries over a larger time period than N time units. For instance, a time period of 1 second may be used, where all non-zero entries may be divided by a sum of the number of non-zero entries to provide an average value. This averaged value may therefore be considered the "smoothed" historical time series value for the entity. A similar method may be performed for TBS values.

The smoothing of MCS values may be different from the smoothing of PRB and TBS values, in the sense that a smoothing function may be applied over a number of time units only when PRBs may be assigned. The MCS value may possibly be irrelevant if the UE of interest may not be assigned a PRB at a particular TTI.

Due to the uniqueness of MCS values, various well-known data smoothing methods/algorithms may be applied. These well-known methods/algorithms may include the use of moving averages, a kernel smoother or a Kalman filter. A smoothing window may be chosen according to a prediction horizon of interest. The prediction horizon may define the number of future time units which may be desired in order to predict future MCS values. A small window may be selected if short-term predictions (10s to 100s of milliseconds) may be desired, while longer-term prediction (second to 10s of seconds) may be used if relatively longer smoothing windows may be desired. The choice of the smoothing window size may be dictated by how far ahead one want to predict—provided that a one step look ahead prediction may be being performed. If it is desired to predict 1 sec into the future, past values need to averaged at 1 second intervals. Another consideration may be the number of operations per second. Larger averaging reduces the operational load on the processing unit. Another consideration may be that the application may dictate how far ahead in the future predictions need to be performed, or at what time granularity predictions should be made available to the application. For example if the application changes its state every 1 second—one may select the averaging window to be 1 sec wide. If application states changes at the 100 m-sec rate—then one should select averaging window size as 100 m-sec. Smoothing and averaging has been used interchangeably here. Smoothing is a general term—averaging is one example of smoothing algorithm.

At the conclusion of step S502, TBSF 240 may determine a full set of historical (past) times series data that may be "smoothed," which may be denoted as $\overline{TBS_p}$, $\overline{MCS_p}$, and $\overline{PRB_p}$. In the smoothing operation, the smoothed output may be quantized to the discrete set of numbers to which the values of MCS, PRB and TBS may belong. As an example, typical values for MCS range within a set {0, 1, . . . 31}. PRB and TBS also belong to a finite discrete set of values.

In step S504, TBSF 240 may predict smoothed MCS and PRB values using well-known prediction methods. Specifically, the prediction methods may learn a model to predict future MCS and PRB values based on the historical time series data for these values, by capturing stochastic patterns for time dependent sequences. The well-known prediction methods may include an auto-regression method, where time series prediction models may be autoregressive integrated to utilize moving average (ARIMA) models. Extensions to produce vector-value data may include multivariable time-series models, such as vector auto-regression (VAR), in order to predict MCS and PRB values in a vector-based model. The predicted (future) values of smoothed MCS and PRB may be denoted as $\overline{MCS_f}$ and $\overline{PRB_f}$, respectively. In ARIMA prediction operations, the predicted output may be quantized to a discrete set of numbers which may include the values of MCS and PRB. As an example, a typical set of MCS values may be the set {0, 1, . . . 28}. PRB may also belong to a finite discrete set. The linear model may be fitted assuming $\overline{MCS_p}$, and $\overline{PRB_p}$ are ARIMA processes, where the ARIMA models may be derived and the models may be used to predict future vales $\overline{MCS_f}$ and $\overline{PRB_f}$. The values may be predicted 1 time-increment ahead of real-time, or multiple time increments ahead (relative to real-time). The ARIMA modeling and prediction are well-known in the art, and described for example in, "Time Series Analysis", George E. P. Box, Gwilym M. Jenkins, Gregory C. Reinsel, 3rd Edition, Prentice Hall, 1994, pages 7-18, and "Automatic Time Series Forecasting: The forecast Package for R", R. J. Hyndman and Y. Khandakar, Journal of Statistics Software, Vol 27, No. 3, July 2008 (the contents of each of which is incorporated by reference in its entirety).

In step S506, TBSF 240 may produce a functional regression mapping function that models the functional relationship of output $\overline{TBS_p}$ and input pairs $\{\overline{MCS_p}, \overline{PRB_p}\}$ according to Equation 1 of the "training phase" (described above). Specifically, the smoothed past values of $\overline{MCS_p}$ and $\overline{PRB_p}$ may be used as "training input" samples, while historical smoothed times series as $\overline{TBS_p}$ may be used as "training output" samples in order to fit the functional regression mapping. In the fit, a distance metric may be used to calculate the distance of the input training data points to the input variable of the model (d $(X, X_i)$). The distance may be any measure that satisfies canonical distance properties. A parameter (h) may be used to select the bandwidth of the smoothing operation. (h) may be derived based on optimization, trial and error, or this value may be predefined. A Kernel may be used in smoothing the distances, where an example kernel is shown in Equation 3. However, other well-known Kernels in the art may also be used. The smoothed values for the entire training set may then be used to form the functional relationship $\hat{r}(X)$. The input values in this step may be $\overline{TBS_p}$ and $\{\overline{MCS_p}, \overline{PRB_p}\}$ (from step S502), where parameters may be K, h and N (where N may be the training sequence length). The output may be the regression function estimate $\hat{r}(X)$ (see Equation 5). In this regression function computation, the input and output training samples may be quantized to discrete set of numbers to which the values of MCS, PRB and TBS may belong. As an example, a typical set for MCS may be the set {0, 1, . . . 28}. PRB and TBS may also belong to finite discrete sets. In evaluating $\hat{r}(X)$, possible values of X may only be meaningful at the finite set values where MCS and PRB may be defined.

Possible well-known regression models that may be used to produce the mapping function may a Gaussian process, a functional linear, or a nonlinear regression. A well-known regression model that may be well-suited for predicting TBS values may be included in "Statistical Computing in Functional Data Analysis: The R Package fda.usc," Manuel Febrero-Bande and Manuel Oviedo de la Fuente, The R Journal, Vol. 51 Issue 4, 64-72, October 2012 (the contents of which is incorporated by reference in its entirety).

In step S508, TBSF 240 may use the mapping function determined in step S506 in order to predict future values of TBS, and these values may be denoted as $\overline{TBS_f}$. Input into the mapping function may include the smoothed predicted (future) values $\overline{MCS_f}$ and $\overline{PRB_f}$, using Equation 5. In this step, inputs may be $\overline{MCS_f}$ and $\overline{PRB_f}$ (at a given future time interval) from step S504, and the regression function $\hat{r}(X)$ that may be derived from step S506. The output may be the predicted $\overline{TBS_f}$ at a time index where the input $\overline{MCS_f}$ and $\overline{PRB_f}$ may be defined. In the function regression predicted output operation, the predicted output may be quantized to a discrete set of numbers to which the values of TBS may belong.

Once TBSF 240 predicts $\overline{TBS_f}$ values, this information may be communicated to an application layer, either to an application server 102 (see FIGS. 6 and 7), or to an application server 102 and/or an application client 110a of a UE 110. The future values of the modulation and coding scheme and physical resource block may also be exported. Based on this exported information, the application server 102 and/or application client 110a may change a behavior of an application. Specifically, the predicted $\overline{TBS_f}$ values (and the $\overline{MCS_f}$ and $\overline{PRB_f}$ values) may be exported to control a rate of an application. For instance, the information may be used to predict future throughput, including predicting a cell load and a channel quality, while also predicting scheduler behavior (i.e., system behavior).

Predicted $\overline{TBS_f}$ values may control an operation of an application, or control a rate of an application, for hypertext transfer protocol (HTTP) Adaptive Streaming (HAS), for example. HAS clients may request higher or lower video quality from a server based on an estimate of calculated network throughput. Therefore, TBS prediction may enable HAS clients to accurately have knowledge of a rate of a channel and adapt the HAS behavior, accordingly. The adaptation may be in the form of limiting a client's requested video quality increase or decrease based on the predicted $\overline{TBS_f}$ values, in addition to providing predictive capabilities for the client based on a predicted network rate. This adaptation may enable smoother video play back, and a better quality of experience, for the user.

Predicted $\overline{TBS_f}$ values may also control an operation of an application, or control a rate of an application, for Transport Control Protocol (TCP) applications, for example. TCP applications use acknowledgements from a receiving entity to adjust a rate of transmission. Therefore, if an entity running a TCP application has knowledge of the future network rate, this information may enable TCP to avoid retransmissions. This may result in a better utilization of network resources with actual data being received without frequent retransmissions. The reduction of retransmissions may enable a better user experience.

Predicted $\overline{TBS_f}$ values may also control an operation of an application, or control a rate of an application, for video telephony, for example. A video encoding rate involved in video conferencing (for example), may benefit from an estimate of channel throughput to adjust video coding rates.

Such video applications may increase a video rate based on an estimate of the network, for instance. Therefore, predicted $\overline{TBS_f}$ values enable video codecs to select more appropriate coding rate that the network may be able to support. TBS knowledge-based codecs may in turn deliver video with less jitter and latency, with a better end user experiences and a smoother video conversation.

Predicted $\overline{TBS_f}$ values may also control an operation of an application, or control a rate of an application, for network predictive control theory in the remote operation of cameras, a Control Area Network (CAN) of automobiles, the control of airplanes, etc. In these applications, the network may use estimates of a network delay, where a delay in control theory may change a stability of the system. Therefore, advanced knowledge of TBS values may help control entities may allow these applications to consider the network rate in adapting control loop bandwidths to optimize stability. This may lead to more stable network control, and possibly less engineered networks, thereby reducing costs.

Predicted $\overline{MCS_f}$ and $\overline{PRB_f}$ values may be used to for future rate of bearers. The MCS value may indicate a rate of bits/second/Hz that may be indicative of a rate. The PRB value may indicate a number of blocks of a carrier that may be received at a UE, and this information may be divided by a total number of blocks that may be supported by the carrier, indicating a portion of a bandwidth that the UE may receive. Knowing this bandwidth information, required network resources for the UE and eNodeB may be accurately forecasted.

Predicted $\overline{TBS_f}$, $\overline{MCS_f}$ and $\overline{PRB_f}$ values may also predict an entire system. As stated above, MCS, PRB and TBS values define a channel, a cell load, user behavior, eNodeB algorithms etc. Each of these dependencies may be captured in the ARIMA (for MCS and PRB) and the functional regression (for TBS). Having knowledge of these models implies an overall knowledge of the system behavior. The dependencies of the ARIMA process are captured in the function regression model via Equation 1.

Figure 6:
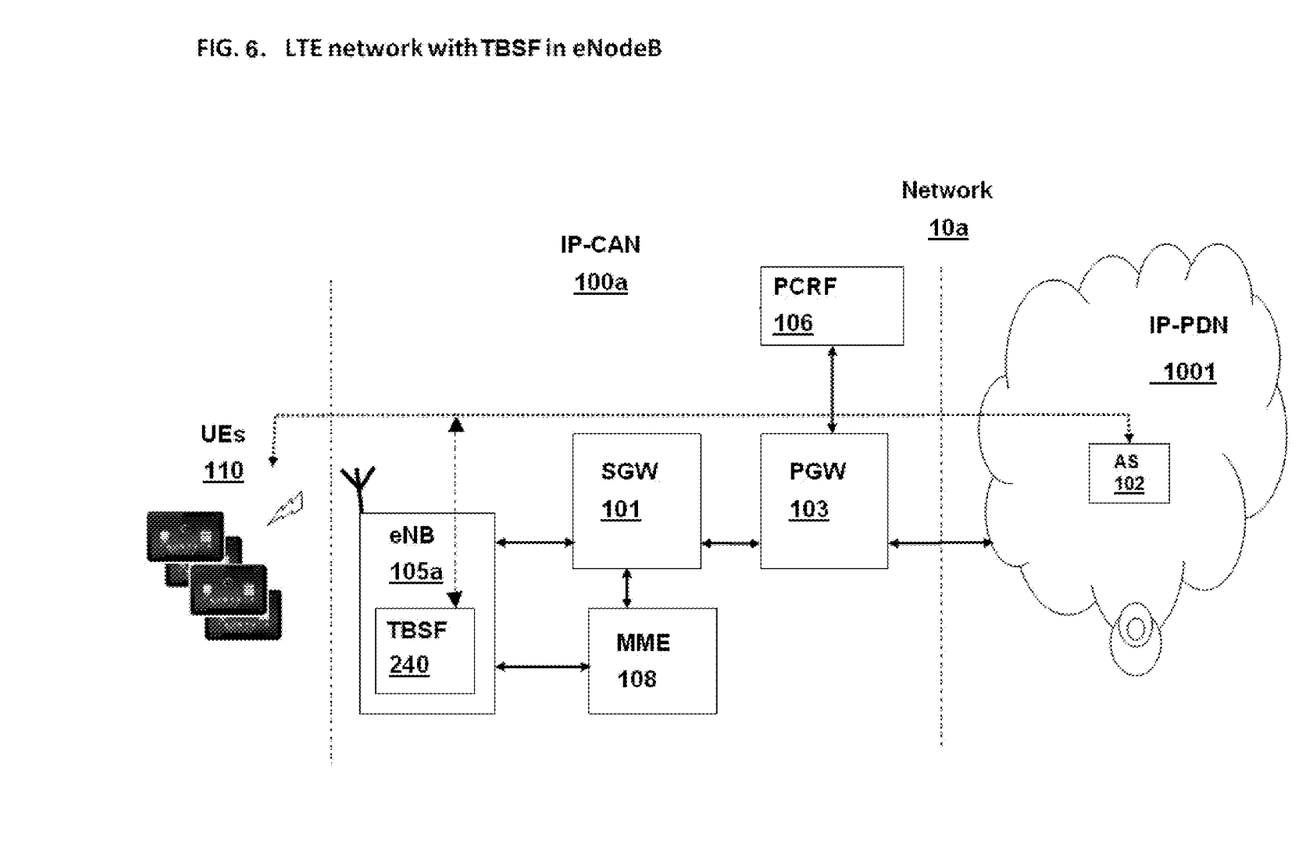
FIG. 6 illustrates a reconfigured 3GPP LTE network, in accordance with an example embodiment.

FIG. 6 illustrates a reconfigured 3GPP LTE network 10*a*, in accordance with an example embodiment. The network 10*a* may include a reconfigured eNB 105*a* that includes TBSF 240 (shown in detail in FIG. 4, and functionally described in FIG. 5). TBSF 240 may share the $\overline{TBS_f}$ values with AS 102 and/or UE 110 in order to improve application performance on the UE 110.

Figure 7:
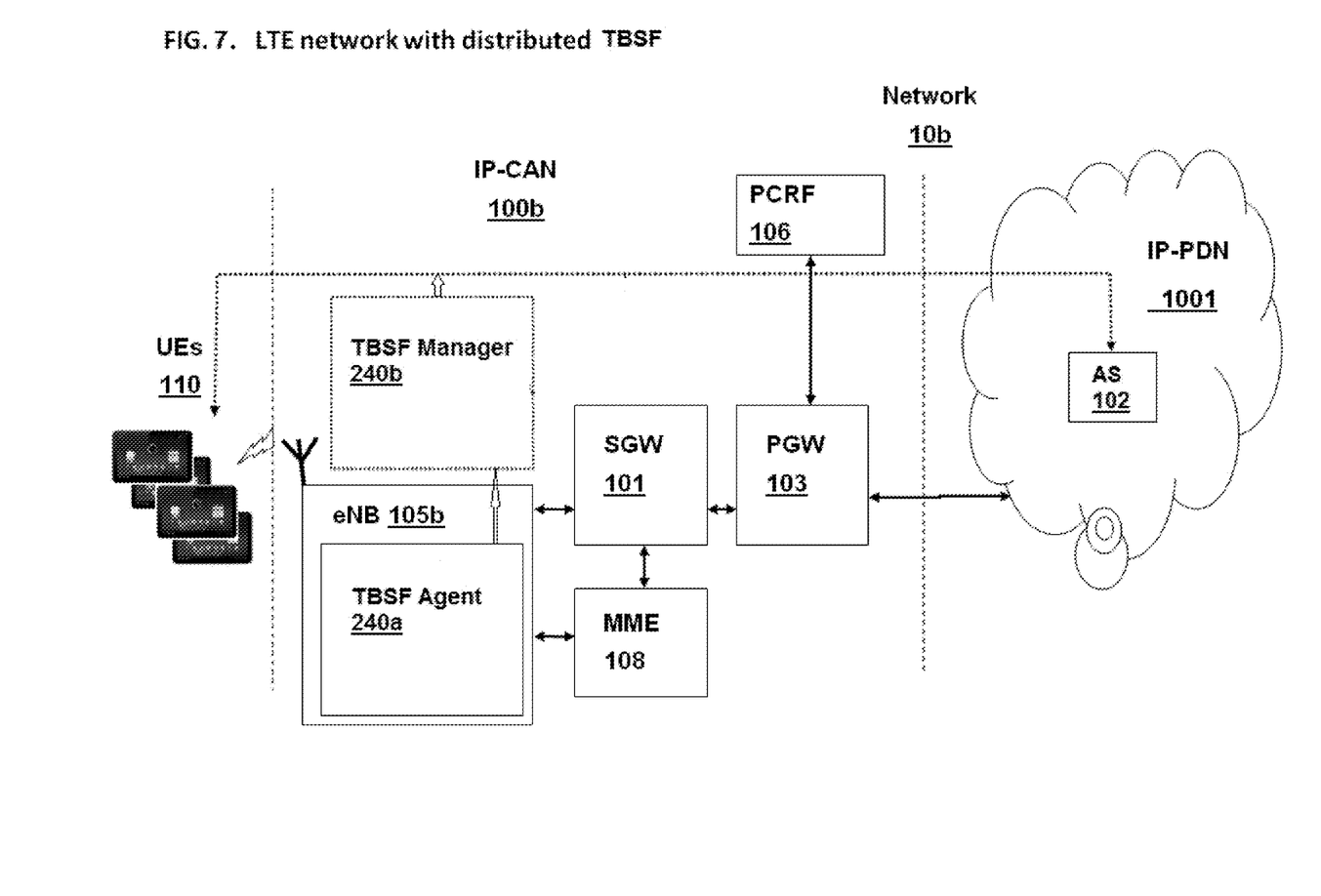
FIG. 7 illustrates another reconfigured 3GPP LTE network, in accordance with an example embodiment.

FIG. 7 illustrates another reconfigured 3GPP LTE network 10*b*, in accordance with an example embodiment. In this embodiment, the function of TBSF 240 may be split into two locations. Specifically, a transport block size forecaster agent (TBSFA) 240*a* may perform the functions of steps S500 and S502, as described in FIG. 5. TBSFA 240*a* may then transmit the smoothed historical data derived from step S502 to a transport block size forecaster manager (TBSFM) 240*b*, where TBSFM 240*b* is a managing entity that may then perform the functions of steps S504, S506 and S508 of FIG. 5.

TBSFM 240*b* may be a stand-alone, dedicated server that may be controlled by a dedicated processor. Or, alternatively TBSFM 240*b* may be included in an existing node of IP-CAN 100*b*. The more proximally close TBSFM 240*b* is to TBSFA 240*a* of eNB 105*b*, the more responsive the system may be to providing predicted $\overline{TBS_f}$ values to AS 102 and/or UE 110 in order to assist in determining system throughput and improving the performance of application that may be run on UE 110.

Additionally, it should be understood that $\overline{TBS_f}$ need not be sent to only AS 102 and/or client UE 110. Rather, this information may be sent to a policy server which may use per-UE $\overline{TBS_f}$ information to generate individual UE policies based on the collective per-UE $\overline{TBS_f}$ information with an overall goal of assisting eNB throughput and supporting service provider policies.

The smoothed past values may in addition be transmitted to a cloud computing cluster where predictions may be performed in parallel computing clusters. Such predicted values then may be distributed to UE 110 and AS 102 (see FIG. 7). It should be noted that for a complex network there will be multiple UEs and Application Servers in the system. The cloud computing platforms will coordinate the smoothed metric gathering and distribute the predicted values in a meaningful manner to the UEs and Application Servers—such that only relevant load information may be delivered to the corresponding UEs and Application Servers. For example, if a UE may be served by a first Application Server, then it would be irrelevant to send UE a predicted value for a different UE in another cell served by another Application Server. If a UE belongs to a particular cell, then only metrics associated with that particular cell should be used to form prediction for that UE. In addition, with Network Function Virtualization, the eNodeB functions creating the MCS, PRB and TBS values may be located in a cloud. As such, the contents of this application will hold with calculations for modeling, prediction, smoothing taking place in the cloud.

It should be understood that while the example embodiments refer to a LTE network, these embodiments could also be applied to other wireless access networks where wireless resources used to transmit data traffic may be allocated by a corresponding wireless access technology scheduler for resource allocation as a function of cell load and etc. and bits per second per Hz calculation (analogous to LTE MCS). Examples of such technologies include but not limited to 3GPP WCDMA, UMTS, 3GPP2 EVDO, WiMAX, Wi-Fi.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of exporting a smoothed transport block size to control an operation of an application, comprising:

obtaining, by one or more processors of at least one network node, historical time series data, the historical time series data including historical transport block size information, historical modulation and coding scheme information and historical physical resource block utilization information;

predicting, by the one or more processors, future value information based on the historical time series data, the future value information including modulation and coding scheme future values and physical resource block future values;

producing, by the one or more processors, a mapping function regressing first input data to first output data, the first input data including the historical modulation and coding scheme information and the historical physical resource block utilization information, the first output data including the historical transport block size information;

forecasting, by the one or more processors, a smoothed transport block size by inputting the future value information into the mapping function; and exporting, by the one or more processors, the smoothed transport block size to a network node to control an operation of an application.

2. The method of claim 1, wherein the exporting of the smoothed transport block size includes exporting the smoothed transport block size to at least one of an application server and an application client server at a user equipment in order to control the operation of the application.

3. The method of claim 2, further comprising:
exporting at least one of the modulation and coding scheme future values and the physical resource block future values to at least one of the application server and the application client at the user equipment in order to control the operation of the application.

4. The method of claim 1, further comprising:
smoothing the historical time series data prior to predicting the future value information, wherein the future value information is smoothed future value information.

5. The method of claim 1, wherein the predicting of the future value information based on the historical time series data includes using Auto-Regressive Integrated Moving Average (ARIMA) regression modeling to predict the future value information.

6. The method of claim 5, wherein the predicting of the future value information based on the historical time series data includes the future value information being quantized to a first and second set of discrete numbers, the first set of discrete numbers being the modulation and coding scheme future values, and the second set of discrete numbers being the physical resource block future values.

7. The method of claim 6, wherein the forecasting of the smoothed transport block size further includes forecasting a third set of discrete numbers by inputting the first set of discrete numbers and the second set of discrete numbers into the mapping function, the mapping function being a functional regression model, the third set of discrete numbers being transport block size future values.

8. The method of claim 7, wherein the first set of discrete numbers, the second set of discrete numbers, and the third set of discrete numbers each are assigned an observation period, wherein the observation period is one of preselected, adjustable and adaptable.

9. The method of claim 7, wherein the forecasting of the smoothed transport block size further includes smoothing the transport block size future values, the smoothing being accomplished via a kernel utilizing a smoothing bandwidth and distance measure, the smoothing bandwidth and the distance measure being one of preselected, adjustable and adaptable.

10. The method of claim 1, wherein the future value information and the forecasted average transport block size are determined for a selectable time-increment that is ahead of real-time.

11. The method of claim 1, wherein the obtaining step is performed at an e-Node B, and the predicting, the producing and the forecasting step is performed at a managing entity outside of the e-Node B.

12. A network node, comprising:
one or more processors configured to,
obtain historical time series data, the historical time series data including historical transport block size information, historical modulation and coding scheme information and historical physical resource block utilization information,
predict future value information based on the historical time series data, the future value information including modulation and coding scheme future values and physical resource block future values,
produce a mapping function regressing first input data to first output data, the first input data including the historical modulation and coding scheme information and the historical physical resource block utilization information, the first output data including the historical transport block size information,
forecast a smoothed transport block size by inputting the future value information into the mapping function, and
export the smoothed transport block size to a network node to control an operation of an application.

13. The network node of claim 12, wherein the one or more processors is further configured to export the smoothed transport block size by exporting the smoothed transport block size to at least one of an application server and an application client server at a user equipment in order to control the operation of the application.

14. The network node of claim 13, wherein the one or more processors is further configured to,
export at least one of the modulation and coding scheme future values and the physical resource block future values to at least one of the application server and the application client at the user equipment in order to control the operation of the application.

15. The network node of claim 12, wherein the one or more processors is further configured to:
smooth the historical time series data prior to predicting the future value information, wherein the future value information is smoothed future value information.

16. The network node of claim 12, wherein the one or more processors is further configured to predict the future value information based on the historical time series data includes using Auto-Regressive Integrated Moving Average (ARIMA) regression modeling to predict the future value information.

17. The network node of claim 16, wherein the one or more processors is further configured to predict the future value information based on the historical time series data by the future value information being quantized to a first and second set of discrete numbers, the first set of discrete numbers being the modulation and coding scheme future values, and the second set of discrete numbers being the physical resource block future values.

18. The network node of claim 17, wherein the one or more processors is further configured to forecast the smoothed transport block size by forecasting a third set of discrete numbers by inputting the first set of discrete numbers and the second set of discrete numbers into the mapping function, the mapping function being a functional regression model, the third set of discrete numbers being transport block size future values.

19. The network node of claim 18, wherein the one or more processors is further configured to assigned an observation period for each of the first set of discrete numbers, the second set of discrete numbers, and the third set of discrete numbers, wherein the observation period is one of preselected, adjustable and adaptable.

20. The network node of claim 18, wherein the one or more processors is further configured to forecast the smoothed transport block size by smoothing the transport block size future values, the smoothing being accomplished via a kernel utilizing a smoothing bandwidth and distance measure, the smoothing bandwidth and the distance measure being one of preselected, adjustable and adaptable.

* * * * *